US012250507B2

(12) United States Patent
Englishman

(10) Patent No.: US 12,250,507 B2
(45) Date of Patent: Mar. 11, 2025

(54) SUSPENDED MICROPHONE HOLDER

(71) Applicant: Jenny-Bea Englishman, Los Angeles, CA (US)

(72) Inventor: Jenny-Bea Englishman, Los Angeles, CA (US)

(73) Assignee: Jenny-Bea Englishman, Los Angeles, CA (US)

( * ) Notice: Subject to any disclaimer, the term of this patent is extended or adjusted under 35 U.S.C. 154(b) by 107 days.

(21) Appl. No.: 18/204,577

(22) Filed: Jun. 1, 2023

(65) Prior Publication Data

US 2024/0179442 A1 May 30, 2024

Related U.S. Application Data

(60) Provisional application No. 63/352,090, filed on Jun. 14, 2022.

(51) Int. Cl.
*H04R 1/08* (2006.01)

(52) U.S. Cl.
CPC .................................... *H04R 1/08* (2013.01)

(58) Field of Classification Search
CPC ............... H04R 1/08; H04R 1/00; H04R 1/02
See application file for complete search history.

(56) References Cited

U.S. PATENT DOCUMENTS

| | | | | |
|---|---|---|---|---|
| 9,998,811 | B1 * | 6/2018 | Avant ....................... | H04R 1/08 |
| 2019/0379960 | A1 * | 12/2019 | Bigeh .................... | H04R 1/406 |

* cited by examiner

*Primary Examiner* — Tuan D Nguyen
(74) *Attorney, Agent, or Firm* — Fish IP Law, LLP

(57) ABSTRACT

A microphone holder supports a microphone from above by multiple cords. The support system provides good vibrational insulation in many different conditions, including for example when the user is traveling and a floor stand is inconvenient or unavailable.

15 Claims, 2 Drawing Sheets

SUSPENDED MICROPHONE HOLDER

This application claims priority to U.S. provisional application Ser. No. 63/352,090, filed Jun. 14, 2022.

FIELD OF THE INVENTION

The field of the invention is microphone positioning devices.

BACKGROUND

The background description includes information that may be useful in understanding the present invention. It is not an admission that any of the information provided herein is prior art or relevant to the presently claimed invention, or that any publication specifically or implicitly referenced is prior art.

It is commonplace for musicians to support a microphone from below, on a tripod or other stand. It is also known to support a microphone from above, either on the end of a support pole, or dangling from a cable.

Both of those solutions can be impractical for a traveling musician, where for example carrying a tripod is cumbersome, or setting up a tripod is difficult in a cramped space.

What is needed are apparatus and methods in which a microphone is supported by multiple cords from above.

SUMMARY OF THE INVENTION

The inventive subject matter provides apparatus, systems, and methods in which a microphone is supported from above by multiple cords.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
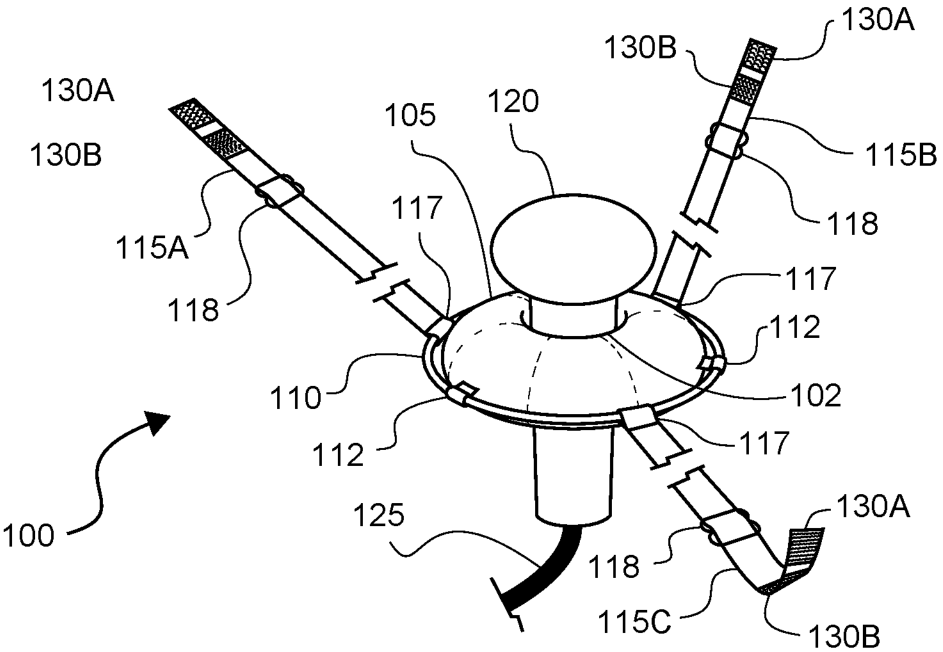
FIG. 1 is a perspective view of a holder for supporting a microphone.

In preferred embodiments, as for example the embodiment 100 shown in FIG. 1, the microphone 120 is positioned within a through-hole 102 of a cradle 105. The cradle 105 can be made of any suitable material or materials, including for example a foam that serves to contain the cradle about the microphone, and also dampen vibrations between the microphone and the cords. Suitable foams have low Intention Load Deflection (ILD) values, and in some embodiments have an ILD value of 1-3. 4. Compressibility of the compressible material is preferably such that a horizontal diameter of the through-hole is expandable by between 10% and 20% upon insertion of the microphone.

Contemplated cradles are 10 to 15 cm in widest distance across, and more preferably about 12-13 cm across, with a greatest height of 0.4 to 0.7 cm, and more preferably about 0.5 cm high. All references to ranges should be interpreted as including the endpoints of the ranges. A user can position the microphone 120 within the through-hole 102 at a desired angle, which in many instances will be less than 10° off vertical.

A ring, polygon or other support 110 can advantageously be positioned between the cradle 105 and the cords 115A, 115B, 115C, and serves to assist in preventing the cradle from becoming deformed. The support 110 can be coupled to the cradle 105 using connectors 112.

The cords are preferably spaced apart around the support, and are preferably not slidable around the support. Cords can have round cross-sections such as in a rope, or substantially flattened cross sections as in a belt. The cords are preferably adjustable in length, which can advantageously be accomplished using a loop 117 that wraps around the support 110, and is adjusted with a clip 118. The far ends of the cords can include any suitable type of connector. Cord 115A has a Velcro™ type of hook and loop fastener 130A, 130B. Cords are preferably 2-3 meters long, and can be at least partially elastic in a longitudinal direction.

Figure 2:
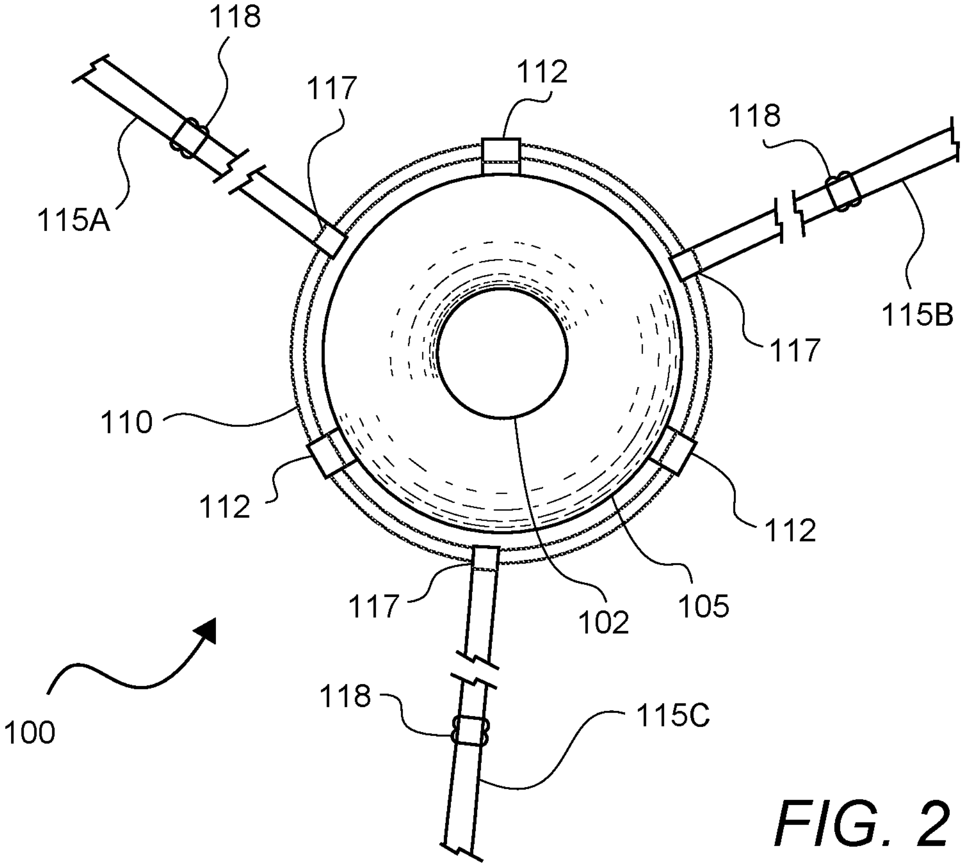
FIG. 2 is a plan view of the microphone of FIG. 1.

FIG. 2 shows a plan view of the device 100 of FIG. 1, showing the through-hole 102 of the cradle 105, support 110, connectors 112, loops 117, clips 118, and cords 115A, 115B and 115C.

Figure 3A:
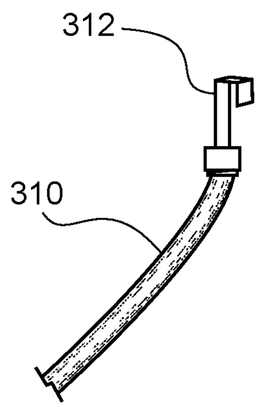
FIG. 3A is a perspective view of an exemplary cord with a first type of hook.
Figure 3B:
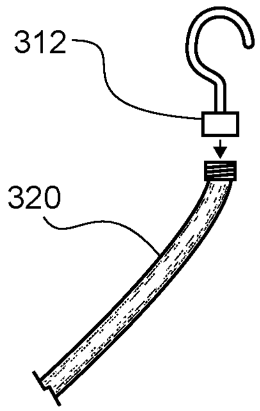
FIG. 3B is a perspective view of an exemplary cord with a second type of hook.

FIG. 3A shows an exemplary cord 310, with a first type of hook 312. FIG. 3B shows an exemplary cord 320, with a second type of hook 322. cord 310 has a round cross-section, whereas cords 115A, 115B and 115C are flattened straps.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A holder for supporting a microphone, comprising:

a compressible material having a through-hole configured to receive the microphone;

a support coupled to the compressible material, and depending from at least first, second, and third spaced apart, elongated cords.

2. The holder of claim 1, wherein the compressible material comprises a foam.

3. The holder of claim 1, wherein the foam has an Intention Load Deflection (ILD) value of 1-3.

4. The holder of claim 1, wherein compressibility of the compressible material is configured such that a horizontal diameter of the through-hole is expandable by between 10% and 20% upon insertion of the microphone.

5. The holder of claim 1, wherein the support is disposed about a lateral rim of the compressible material, and further comprising at least first, second, and third spaced apart connectors.

6. The holder of claim 5, wherein the support is ring shaped.

7. The holder of claim 1, further comprising a loop and adjustment clip configured to adjust a length of the first cord.

8. The holder of claim 1, wherein at least one of the first, second, and third cords is at least partially elastic in a longitudinal direction.

9. The holder of claim 1, wherein at least one of the first, second, and third cords has a maximum length of at least 2 meters.

10. The holder of claim 1, wherein at least one of the first, second, and third cords includes an end section with a hook or hook and loop fastener.

11. A method of supporting a microphone, comprising:

inserting the microphone through a hole configured in a cradle;

supporting the cradle from above using at least first, second, and third spaced apart, elongated cords; and adjusting a length of a least one of the first, second, and third cords.

12. The method of claim 11, wherein the cradle comprises a foam or other compressible material.

13. The method of claim 11, wherein the step of supporting the cradle from above comprises coupling at least one of the first, second, and third cords to a support ring disposed about a perimeter of the cradle.

14. The method of claim 11, further comprising adjusting the first cord to a length of between 2 and 3 meters, respectively.

15. The method of claim 11, further comprising adjusting a length of the first cord such that the microphone is less than 10° off vertical.

* * * * *